United States Patent
Pal et al.

(10) Patent No.: US 11,924,663 B2
(45) Date of Patent: Mar. 5, 2024

(54) DYNAMIC MEASUREMENT WINDOW DETERMINATION FOR 5G NEW RADIO USER EQUIPMENT

(71) Applicant: QUALCOMM Incorporated, San Diego, CA (US)

(72) Inventors: Arnab Pal, Hyderabad (IN); Jun Zhu, San Diego, CA (US); Yongle Wu, San Diego, CA (US); Jyothi Kiran Vattikonda, San Diego, CA (US); Nitya Raghunath, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/179,102

(22) Filed: Feb. 18, 2021

(65) Prior Publication Data
US 2022/0264347 A1   Aug. 18, 2022

(51) Int. Cl.
*H04W 72/04* (2023.01)
*H04B 7/10* (2017.01)
*H04L 5/00* (2006.01)
*H04W 24/10* (2009.01)

(52) U.S. Cl.
CPC ................................. *H04W 24/10* (2013.01)

(58) Field of Classification Search
CPC . H04W 24/10; H04W 48/16; H04W 74/0808; H04W 72/23; H04W 24/08; H04W 76/28; H04W 52/0216; H04W 52/0229; H04W 48/12; H04W 36/0094; H04W 56/00; H04L 5/0048; Y02D 30/70; H04B 7/1851; H04B 7/1853

USPC .......................................................... 370/252
See application file for complete search history.

(56) References Cited

U.S. PATENT DOCUMENTS

| | | | |
|---|---|---|---|
| 2019/0037509 A1* | 1/2019 | Li ..................... | H04W 56/001 |
| 2019/0261206 A1* | 8/2019 | Gheorghiu .......... | H04L 27/2646 |
| 2019/0261444 A1* | 8/2019 | Axmon ............... | H04B 7/0626 |
| 2020/0015236 A1* | 1/2020 | Kung .................. | H04W 16/14 |
| 2020/0022011 A1* | 1/2020 | Lee .................... | H04W 24/10 |
| 2020/0162939 A1* | 5/2020 | Kim ................... | H04W 56/001 |
| 2020/0322023 A1* | 10/2020 | Kung .................. | H04B 7/0626 |
| 2020/0383060 A1* | 12/2020 | Park ................... | H04W 52/42 |
| 2021/0045076 A1* | 2/2021 | Tomeba .............. | H04L 27/26 |
| 2021/0112536 A1* | 4/2021 | Shah ................... | H04W 72/042 |
| 2021/0112604 A1* | 4/2021 | Bao .................... | H04W 74/0808 |
| 2022/0053434 A1* | 2/2022 | Liu ..................... | H04L 5/0094 |
| 2022/0167254 A1* | 5/2022 | Miao .................. | H04W 72/0446 |

FOREIGN PATENT DOCUMENTS

WO    WO-2022079344 A1 *   4/2022

\* cited by examiner

*Primary Examiner* — Sithu Ko
*Assistant Examiner* — Anneilian Lalchinthang
(74) *Attorney, Agent, or Firm* — ArentFox Schiff LLP

(57) ABSTRACT

Example aspects include a method, apparatus and computer-readable medium of wireless communication at a user equipment (UE), comprising receiving, from a network device, a synchronization signal block (SSB) configuration scheduling a measurement window having a first duration. The aspects further include receiving, from the network device, at least one SSB during the first measurement window. Additionally, the aspects include selecting a second duration of the measurement window according to the at least one SSB. The second duration being shorter than the first duration.

21 Claims, 14 Drawing Sheets

```
1980 Jan  6 00:49:27.731670  [7C]  0xB969  NR5G ML1 Searcher FW Cell Meas Request
Subscription ID = 1
Misc ID         = 0
Major.Minor Version                  = 2.5
SFN                                  = 371
Sub FN                               = 6
Slot                                 = 0
Header
  Seq Id                             = 167
  Action Time                        = FRAME_SUBFRAME_OFFSET_ACTION_TIME
  Action Time Miss Handling          = REQ_NO_HANDLING
  OTA Action Time
    SFN                              = 372
    Sub FN                           = 0
    Slot                             = 0
    SCS                              = 30KHZ
Data
  Num Raster                         = 2
  NB Id Bitmask                      = 0x03
  Is Beam Info Valid                 = false
  Raster
```

|   | Raster Center Frequency (KHz) |        | SSB Bitmap                              |
|---|-------------------------------|--------|-----------------------------------------|
| # |                               |        |                                         |
| 0 | 3550560                       |        | 0x8000000000000000                      |
| 1 | 3550560                       |        | 0x8000000000000000                      |

— 802 SSB Bitmap

|       | NB Common Info |         | SSB Pattern      |         | Max Rx Num Antenna | Logical SSB Bitmask | Is SMTC Win | Raster Freq Delta (KHz) | Serving Cell Id | Tracking Info |
|-------|----------------|---------|------------------|---------|--------------------|---------------------|-------------|-------------------------|-----------------|---------------|
|       | NB ID          |         |                  |         |                    |                     |             |                         |                 |               |
|       | NB_ID_0        |         | 30_KHZ_CASE_C    |         | 8                  | 0x03                | false       | 0                       | 0               | 0             |
|       | NB_ID_1        |         | 30_KHZ_CASE_C    |         | 8                  | 0x0C                | false       | 0                       | 0               | 0             |

— 804 SSB Pattern

| # | Serving Cell SSB Index | Tracking SSB Loop | Tracking SSB Needed | Carrier Index | Doppler Enable | Doppler Reset | Meas Mode | Is Concurrent With Search | Compute Gain |
|---|---|---|---|---|---|---|---|---|---|
| 0 | 0 | 1 | 0 | PCC | false | false | MEAS_NCELL_SYNC_INTRA | 0 | 0 |
| 1 | 0 | 1 | 0 | PCC | false | false | MEAS_NCELL_SYNC_INTRA | 0 | 0 |

Tracking Info

| # | Num Windows | NR ARFCN | Meas Window Start Time | Meas Window End Time Offset | Num Carrier Or SSB Cells | Carrier Index | SSB or Cell # | SSB Boundary Ref Time (Ts) | Cell Offset | SSB Id | Index | Meas Type |
|---|---|---|---|---|---|---|---|---|---|---|---|---|
| 0 | 1 | 636704 | 0 | 6311 | 1 | PCC | 1 | 0 | 2215 | 0 | 0 | SSS_ONLY |
| 1 | 1 | 636704 | 0 | 6311 | 1 | PCC | 1 | 0 | 2215 | 0 | 0 | SSS_ONLY |

Meas Window

```
1980 Jan 6 00:55:17.185430 [04] 0xB969 NR5G ML1 Searcher FW Cell Meas Request
Subscription ID = 1
Major.Minor Version              = 2.5
SFN                              = 575
Sub FN                           = 6
Slot                             = 1
Header
  Seq Id                         = 114
  Action Time                    = FRAME_SUBFRAME_OFFSET_ACTION_TIME
  Action Time Miss Handling      = REQ_NO_HANDLING
  OTA Action Time
    SFN                          = 576
    Sub FN                       = 0
    Slot                         = 0
    SCS                          = 120KHZ
Data
  Num Raster                     = 1
  NB Id Bitmask                  = 0x01
  Is Beam Info Valid             = true
  Raster
```

| # | Raster Center Frequency (KHz) | SSB Bitmap | NB Common Info | | |
|---|---|---|---|---|---|
| | | | NB ID | | |
| 0 | 38519160 | 0xC000000000000003 | NB_ID_0 | | |

SSB Bitmap — 902
SSB Pattern — 904

| | | | | Logical | Raster | Tracking Info |
|---|---|---|---|---|---|---|
| | | SSB Pattern | Max Rx Num Antenna | Is SSB Bitmask | Freq Delta (KHz) | Serving Cell Id |
| | | 120_KHZ_CASE_D | 64 | 0x03 | true | 0 | 0 |

~900

900

| # | Tracking Serving Cell SSB Index | Tracking Info SSB Loop Reset Needed | Tracking Carrier Index | Carrier Doppler Enable | SSB Doppler Reset | SSB Index | Meas Mode | MEAS_NCELL_SYNC_INTRA | | Is Concurrent With Search | Compute Gain |
|---|---|---|---|---|---|---|---|---|---|---|---|
| 0 | 0 | 0 | 0 | PCC | false | 0 | false | false | | 0 | 0 |

| # | Num Meas Windows | Meas Window # | NR ARFCN | Meas Window Start Time | Meas Window End Time Offset | Num SSB Carrier Or Index | SSB or Cell Num Cells | SSB Boundary Ref Time Offset (Ts) | Cell Id | SSB Index | Meas Type |
|---|---|---|---|---|---|---|---|---|---|---|---|
| 0 | 2 | 0 | 2254485 | 0 | 3232 | PCC | 2 | 0 | 1112 | 99 | 0 | SSS_ONLY |
| | | | | | | PCC | | 1 | 2208 | 99 | 1 | SSS_ONLY |
| | 1 | 2254485 | 122880 | 21880 | PCC | 2 | 0 | 19760 | 99 | 62 | SSS_ONLY |
| | | | | | | PCC | | 1 | 20856 | 99 | 63 | SSS_ONLY |

DYNAMIC MEASUREMENT WINDOW DETERMINATION FOR 5G NEW RADIO USER EQUIPMENT

BACKGROUND

Technical Field

The described aspects relate generally to wireless communication systems, and more particularly, to apparatuses and methods for determining durations of measurement windows for 5G New Radio (NR) user equipment (UE).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of wireless communication at a UE, comprising receiving, from a network device, a synchronization signal block (SSB) configuration scheduling a measurement window having a first duration. The method further includes receiving, from the network device, at least one SSB during the first measurement window. Additionally, the method includes selecting a second duration of the measurement window according to the at least one SSB. The second duration being shorter than the first duration.

Another example aspect includes an of wireless communication at a UE, comprising a non-transitory memory storing computer-executable instructions, and a processor communicatively coupled with the memory. The processor is configured to execute the instructions to receive, from a network device, a SSB configuration scheduling a measurement window having a first duration. The processor is further configured to execute further instructions to receive, from the network device, at least one SSB during the first measurement window. Additionally, the processor is further configured to execute further instructions to select a second duration of the measurement window according to the at least one SSB. The second duration being shorter than the first duration.

Another example aspect includes a non-transitory computer-readable medium comprising stored instructions of wireless communication at a UE, executable by a processor, that when executed by the processor cause the processor to receive, from a network device, a SSB configuration scheduling a measurement window having a first duration. The instructions are further executable to receive, from the network device, at least one SSB during the first measurement window. Additionally, the instructions are further executable to select a second duration of the measurement window according to the at least one SSB. The second duration being shorter than the first duration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 8A-8B are diagrams illustrating a first example log of a measurement window duration calculation demonstration, in accordance with various aspects of the present disclosure.

FIGS. 9A-9B are diagrams illustrating a second example log of a measurement window duration calculation demonstration, in accordance with various aspects of the present disclosure.

DETAILED DESCRIPTION

Figure 1:
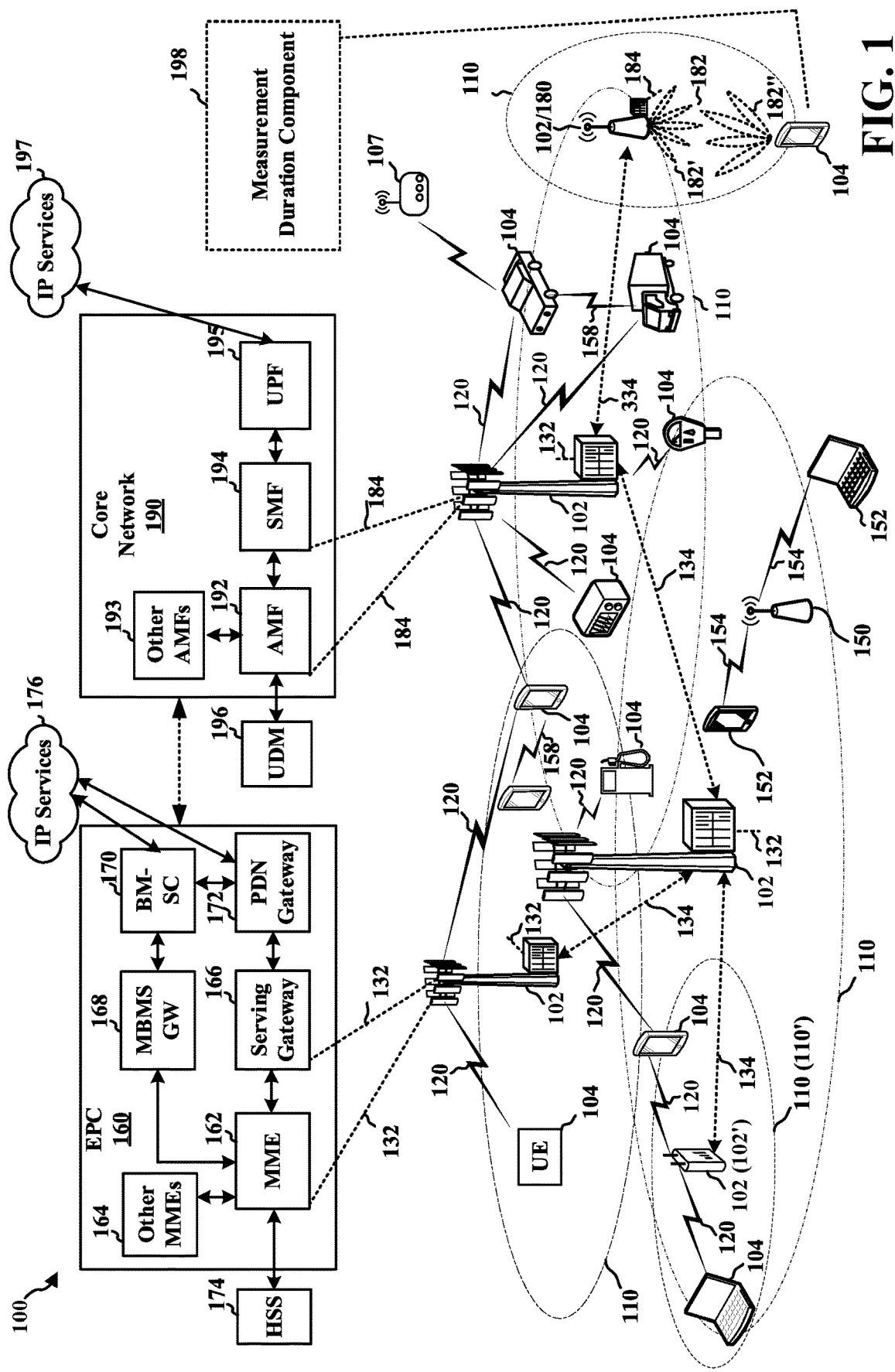
FIG. 1 is a diagram illustrating an example of a wireless communication system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A user equipment (UE) in a wireless communication system may monitor one or more resources for receiving synchronization signal block (SSB) transmissions from a network device. The UE may acquire downlink synchronization information and/or system information based on one or more SSBs received from the network device. The UE may determine a schedule for monitoring the one or more resources for receiving the SSB transmissions according to a SSB configuration received from the network device. The SSB configuration may schedule one or more measurement windows having respective durations during which the UE is to monitor the one or more resources for receiving the SSB transmissions. That is, the UE may activate or power up at least a portion of receive circuitry of the UE for the duration of each of the one or more measurement windows scheduled by the SSB configuration. However, the UE may not receive SSBs during the full duration of the measurement window. In some aspects, the network device may not transmit the maximum number of SSBs supported by the measurement window, and as such, at least a portion of the measurement window may not comprise SSB transmissions. In other aspects, the UE may not be able to receive an SSB transmitted by the network device. For example, a receive signal strength of the transmitted SSB may not be sufficient to be received and/or decoded by the UE. That is, a signal-to-noise ratio (SNR) and/or a reference signal received power (RSRP) level of the transmitted SSB may not exceed a minimum threshold for receiving and/or decoding the transmitted SSB. Nonetheless, a conventional UE may monitor the one or more resources for receiving the SSB transmissions for the full duration of each of the scheduled measurement windows. As such, a conventional UE may perform unnecessary monitoring of the one or more resources for receiving the SSB transmissions. That is, a conventional UE may perform monitoring during portions of measurement windows that may not comprise SSB transmissions or may comprise SSB transmissions that may not be receivable and/or decodable. As a result, power consumption and efficiency of such a conventional UE may be negatively impacted.

Aspects presented herein provide for multiple manners for a UE to dynamically determine a duration of a measurement window. Such a determination may allow the UE to power down receive circuitry of the UE during portions of the measurement window that may not comprise SSB transmissions or may comprise SSB transmissions that may not be receivable and/or decodable. Alternatively or additionally, the determination may further allow the UE to enter a power saving state (e.g., micro-sleep) during such portions of the measurement window. Further, aspects presented herein may reduce power consumption and increase efficiency of the wireless communication system when compared to a conventional wireless communication system.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system and an access network 100. The wireless communication system 100 (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may include a measurement duration component 198 configured to receive a SSB configuration scheduling a measurement window having a first duration. The measurement duration component 198 may determine a schedule for monitoring one or more resources for receiving SSB transmissions according to the SSB configuration. The measurement duration component 198 may be configured to receive at least one SSB during the first measurement window, and to select a second duration of the measurement window according to the at least one SSB.

The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communication system 100 may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on sidelink, V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may provide examples for communication in connection with 5G NR, the concepts described herein may be applicable to other similar areas, such as LTE, LTE-A, CDMA, GSM, and other wireless technologies.

Referring to FIGS. 2A-2D, the diagrams illustrate examples of different resources that may be used for communications between network elements (e.g., base station 102, UE 104) of the wireless communication system and the access network 100 described above in FIG. 1. The resources may be time-based, frequency-based, or both on time and frequency.

Figure 2:
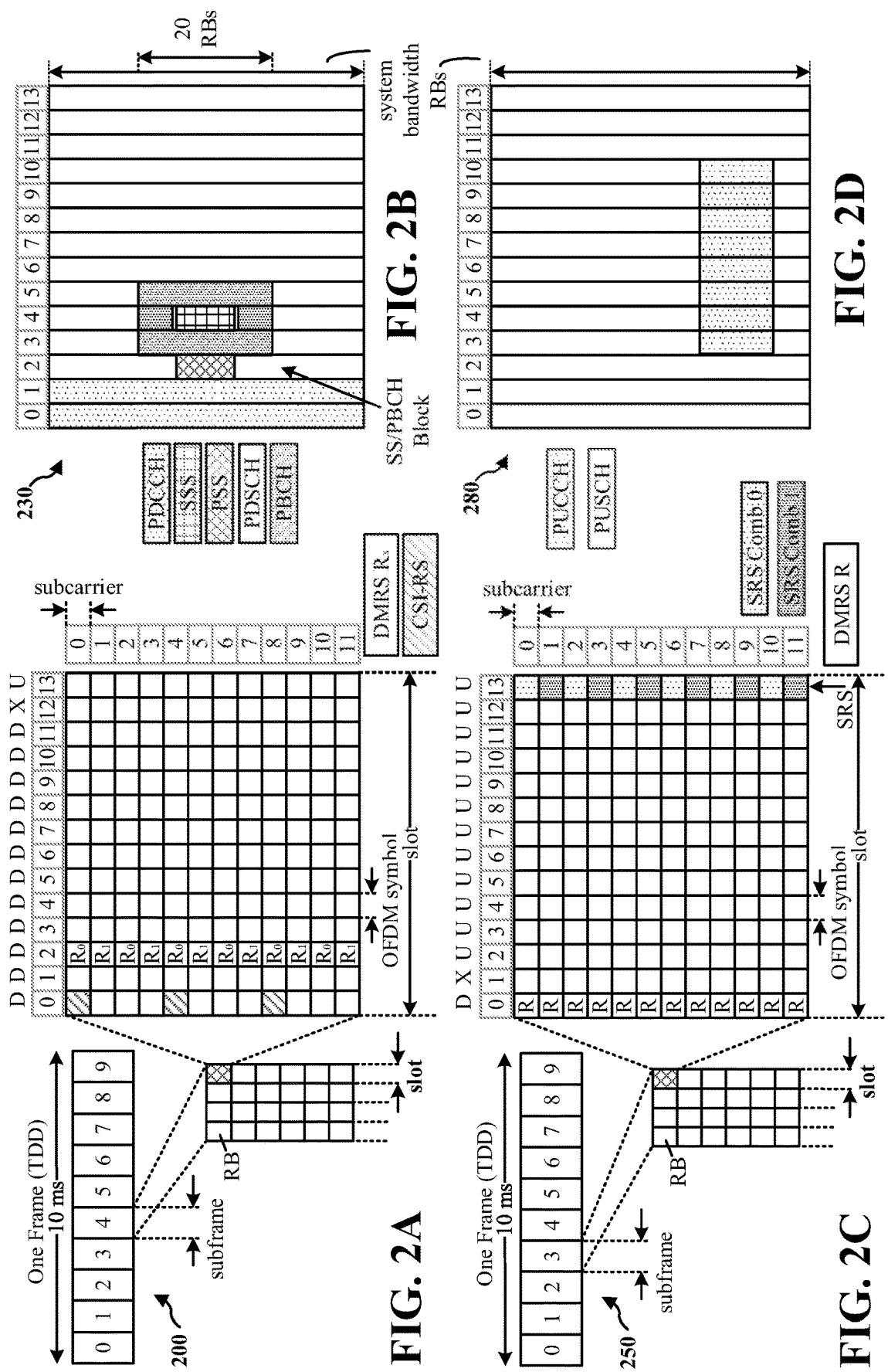
FIG. 2A is a diagram illustrating an example of a first frame, in accordance with various aspects of the present disclosure.
FIG. 2B is a diagram illustrating an example of downlink channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink channels within a subframe, in accordance with various aspects of the present disclosure.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 1 (with all uplink). While subframes 3, 4 are shown with slot formats 1, 28, respectively, any particular subframe may be configured with any of the various available slot formats 0-61. Slot formats 0, 1 are all downlink, uplink, respectively. Other slot formats 2-61 include a mix of downlink, uplink, and flexible symbols.

UEs are configured with the slot format (dynamically through downlink control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include minislots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) OFDM (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various downlink channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The terms SSB and SS/PBCH may be used interchangeably. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
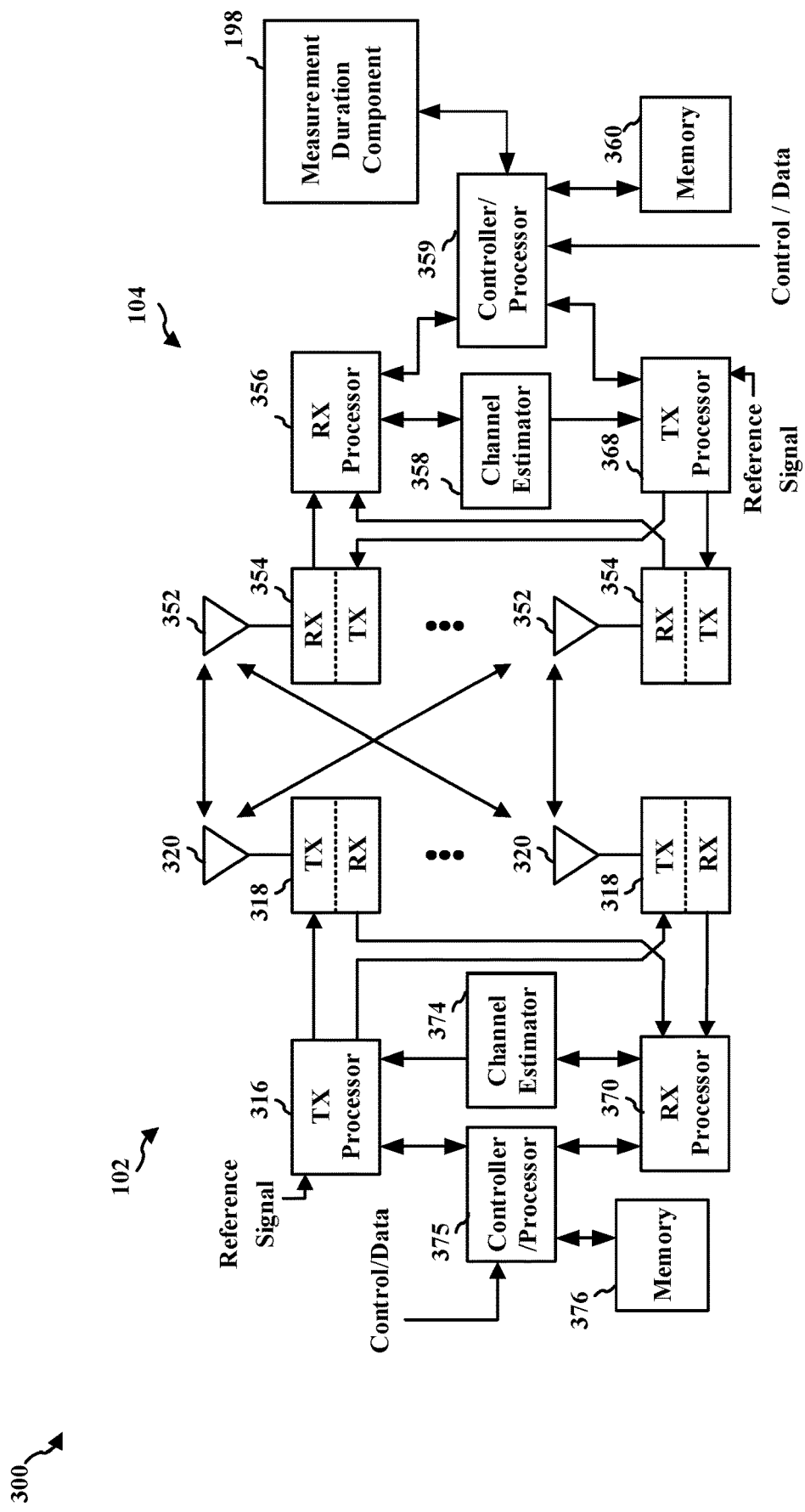
FIG. 3 is a diagram illustrating an example of hardware components of the base station and the UE in the access network, in accordance with various aspects of the present disclosure.

FIG. 3 is a block diagram 300 of example hardware components of a base station 102 in communication with a UE 104 in an access network. In the downlink, IP packets from the EPC 160 may be provided to a controller/processor 375. The controller/processor 375 may implement Layer 3 and/or Layer 2 functionality. Layer 3 may include a radio resource control (RRC) layer, and Layer 2 may include a service data adaptation protocol (SDAP) layer, a packet data convergence protocol (PDCP) layer, a radio link control (RLC) layer, and a medium access control (MAC) layer. The controller/processor 375 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 may implement Layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream may be spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 104, each receiver 354RX may receive a signal through its respective antenna 352. Each receiver 354RX may recover information modulated onto an RF carrier and may provide the information to the receive (RX) processor 356. The TX processor 368 and the RX processor 356 may implement Layer 1 functionality associated with various signal processing functions. The RX processor 356 may perform spatial processing on the information to recover any spatial streams destined for the UE 104. If or when multiple spatial streams are destined for the UE 104, the multiple spatial streams may be combined by the RX processor 356 into a single OFDM symbol stream. The RX processor 356 may then convert the OFDM symbol stream from the time-domain to the frequency domain using a Fast Fourier Transform (FFT). The frequency domain signal may comprises a separate OFDM symbol stream for each subcarrier of the OFDM signal. The symbols on each subcarrier, and the reference signal, may be recovered and demodulated by determining the most likely signal constellation points transmitted by base station 102. These soft decisions may be based on channel estimates computed by the channel estimator 358. The soft decisions may then be decoded and deinterleaved to recover the data and control signals that were originally transmitted by device 310 on the physical channel. The data and control signals may then be provided to the controller/processor 359, which may implement Layer 3 and Layer 2 functionality.

The controller/processor 359 can be associated with a memory 360 that stores program codes and data. The memory 360 may be referred to as a non-transitory computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission may be processed at the base station 102 in a manner similar to that described in connection with the receiver function at the UE 104. Each receiver 318RX may receive a signal through its respective antenna 320. Each receiver 318RX may recover information modulated onto an RF carrier and may provide the information to a RX processor 370.

The controller/processor 375 may be associated with a memory 376 that stores program codes and data. The memory 376 may be referred to as a non-transitory computer-readable medium. The controller/processor 375 may provide demultiplexing between transport and logical channels, packet reassembly, deciphering, header decompression, control signal processing. The controller/processor 375 may also be responsible for error detection using an ACK and/or NACK protocol to support HARQ operations.

At the UE 104, at least one of the TX processor 368, the RX processor 356, and the controller/processor 359 may be configured to perform aspects in connection with the measurement duration component 198 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Network-side communication devices of a wireless communication system 100 (e.g., base station 102) may periodically transmit one or more SSBs to allow other wireless communication devices (e.g., UEs 104) to synchronize with the wireless communication system 100. The network device may transmit the one or more SSBs using multiple signals in a time-division multiplexing (TDM) scheme and/or a frequency-division multiplexing (FDM) scheme. Alternatively or additionally, the signals may be spatially-filtered. That is, the network device may transmit the one or more SSBs in multiple directions using multiple multiplexing schemes. For example, each SSB in the one or more SSB transmissions may be transmitted in a corresponding predefined direction. The predefined directions may be configured to provide service coverage, with each synchronization burst, to at least a portion of a spatial coverage area of the network device. The network device, however, may be limited by predefined rules in the number of SSBs that may be transmitted within a particular time frame. The limitations may be based on various factors, including a subcarrier spacing (SCS) used by the system and a frequency band in which the system operates. For example, one frequency band (e.g., FR1 (410 MHz-7.125 GHz)) may have a maximum of 4 or 8 SSB transmissions within a synchronization burst and another frequency band (e.g., FR2 (24.25 GHz-52.6 GHz)) may have a maximum of 64 SSB transmissions. For another example, the SCS may be set to one of Case A (e.g., 15 kHz), Case B (e.g., 30 kHz), Case C (e.g., 30 kHz), Case D (e.g., 120 kHz), or Case E (e.g., 240 kHz).

In some aspects, the network device may indicate to the UE which SSBs are being transmitted and which SSBs are not being transmitted. The network device may provide to the UE a SSB configuration comprising a SSB bitmask and/or a SSB burst indicating which SSBs are being transmitted, out of a maximum number of SSBs that may be transmitted. For example, the network device may provide a SSB bitmap indicating that SSB_2, SSB_3, SSB_4 and SSB_5 are enabled (e.g., SSB bitmap value of 0x3C). Alternatively or additionally, the SSB configuration may schedule one or more measurement windows during which the UE is to receive the one or more SSBs. For example, the network device may be configured with a maximum measurement window (e.g., 5 milliseconds) that may be equally divided into a number of distinct measurement windows (e.g., measurement windows 0-4). That is, each measurement window may comprise a distinct portion (e.g., 1 millisecond, or 30720 basic time units ($T_S$), each) of the maximum measurement window. As such, the SSB configuration may indicate one or more measurement windows having respective durations during which the UE is to monitor the one or more resources for receiving the SSB transmissions. For example, the SSB configuration may indicate that measurement window 1 and measurement window 2 are scheduled for SSB transmissions.

The UE may monitor one or more resources for receiving the SSB transmissions according to the scheduled measurement windows comprised by the SSB configuration. For example, the UE may activate or power up at least a portion of receive circuitry of the UE for a full duration of each measurement window (e.g., 1 millisecond). However, the UE may not receive SSBs during the full duration of the measurement window. In some aspects, the network device may not transmit the maximum number of SSBs, and as such, at least a portion of the measurement window may not comprise SSB transmissions. In other aspects, the UE may not be able to receive a SSB transmitted by the network device. For example, a receive signal strength of the transmitted SSB may not be sufficient to be received and/or decoded by the UE. That is, a signal-to-noise ratio (SNR) and/or a reference signal received power (RSRP) level may not exceed a minimum threshold for receiving and/or decoding the transmitted SSB. For another example, the SSB may have been transmitted in a direction away from the UE. That is, the UE may be unable to receive the SSB due to the location of the UE in relation to the direction of the SSB transmission. Thus, the UE may continue monitoring the one or more resources for receiving the SSB transmissions during portions of the measurement window that may not comprise SSB transmissions or may comprise SSB transmissions that may not be receivable and/or decodable. As such, the UE may not power down receive circuitry of the UE during such portions of the measurement window. Alternatively or additionally, the UE may not enter a power saving state (e.g., micro-sleep) during such portions of the measurement window. Due to at least these reasons, power consumption and efficiency of the UE may be negatively impacted.

Figure 4:
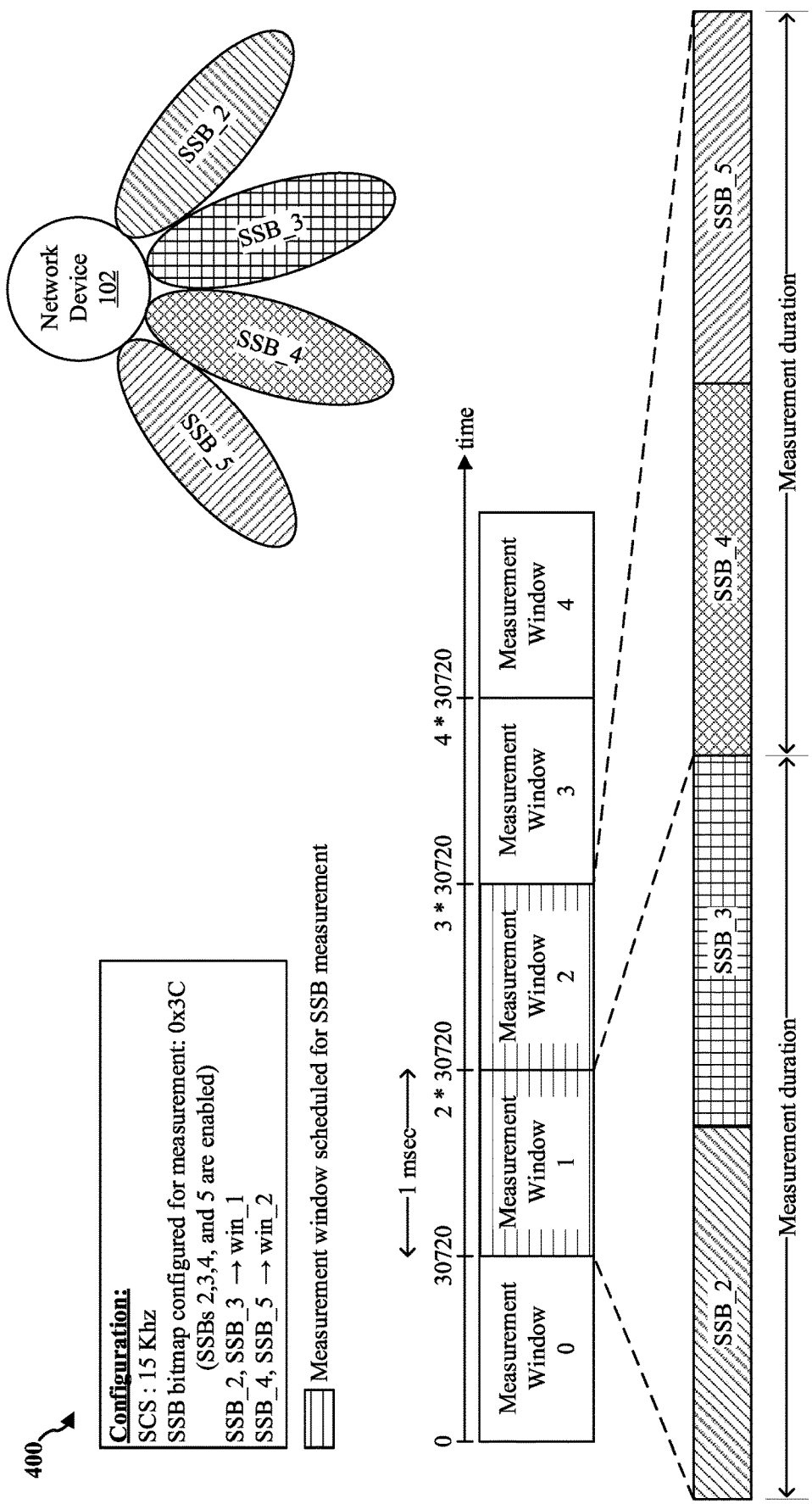
FIG. 4 is a diagram illustrating a first example of a SSB transmission from a network device of a wireless communication system, in accordance with various aspects of the present disclosure.

Referring to FIG. 4, diagram 400 illustrates a first example of a SSB transmission from a network device of a wireless communication system 100. Network device 102 depicted in FIG. 4 is similar in many respects to the network devices (e.g., base station 102) described above with reference to FIGS. 1 and 3, and may include additional features not mentioned above.

The base station 102 may be configured to operate in a first frequency operating band (e.g., FR1 (410 MHz-7.125 GHz)) and may be further configured with a subcarrier spacing of 15 kHz (e.g., Case A) and a SSB bitmap indicating that SSB_2, SSB_3, SSB_4 and SSB_5 are enabled (e.g., SSB bitmap value of 0x3C). The base station 102 may be configured to transmit SSBs during one or more of five measurement windows (e.g., measurement windows 0-4). Each of the five measurement windows may have a duration of 1 millisecond (or 30720 basic time units ($T_S$)). As shown in FIG. 4, the base station 102 may be configured to transmit SSB_2 and SSB_3 during measurement window 1 and to transmit SSB_4 and SSB_5 during measurement window 2. Alternatively or additionally, the base station 102 may transmit SSB_2, SSB_3, SSB_4, and SSB_5 in corresponding predefined directions.

A UE 104 may be configured to receive SSB_2 and SSB_3 by monitoring one or more resources for receiving SSB transmissions during the full duration (e.g., 1 millisecond) of the measurement window 1. Similarly, the UE 104 may monitor the one or more resources for receiving the SSB transmissions during the full duration (e.g., 1 millisecond) of the measurement window 2. In some aspects, the UE 104 may receive SSB_4 but may not be able to receive SSB_5. For example, a SNR and/or RSRP level of SSB_5 may not exceed a minimum threshold. For another example, the UE 104 may not be located within the direction of SSB_5. However, the UE 104 may continue monitoring the one or more resources for receiving the SSB transmissions until the full duration of measurement window 2 has elapsed. As such, a power consumption and efficiency of the UE 104 may be negatively impacted.

Figure 5:
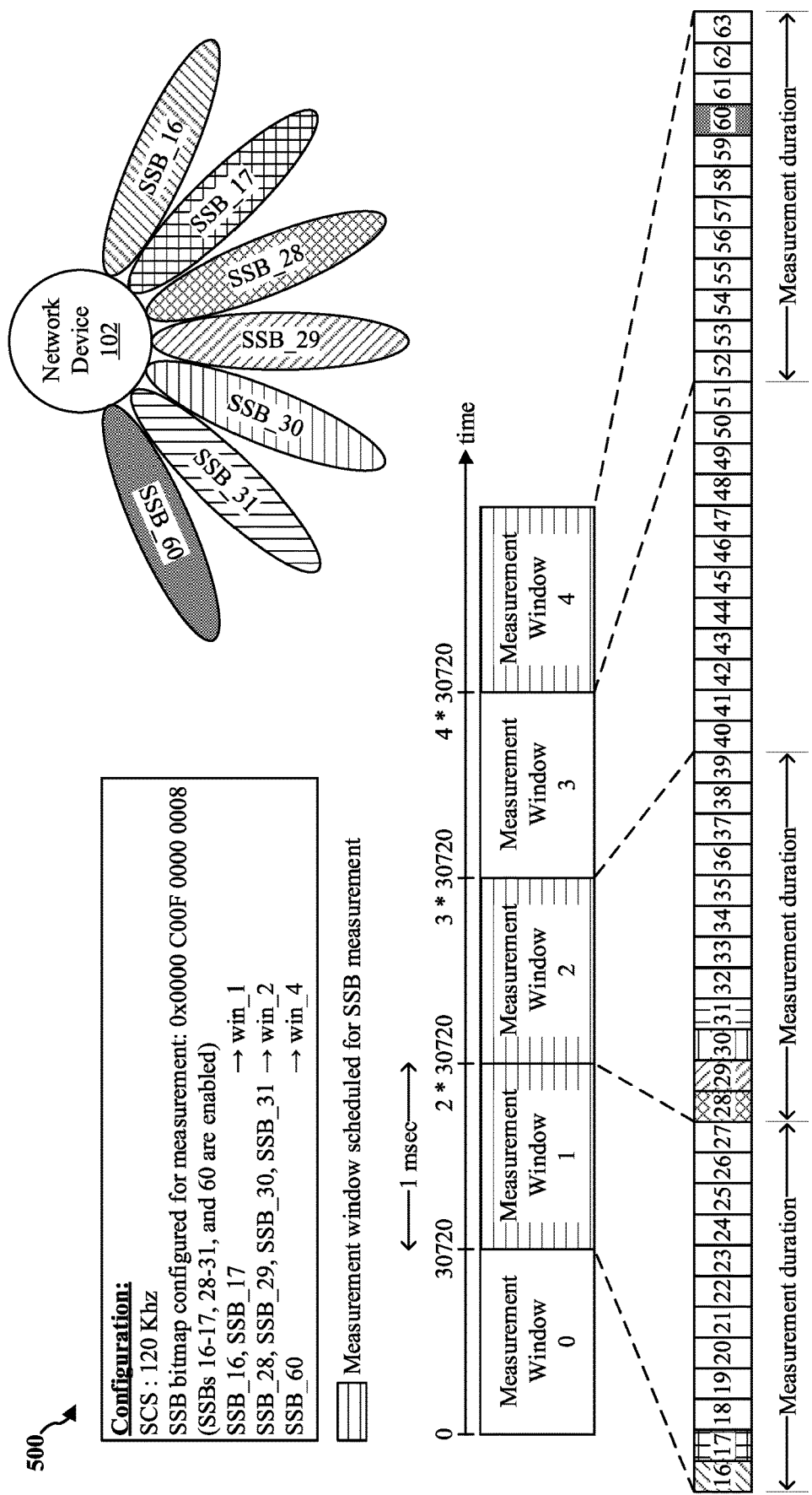
FIG. 5 is a diagram illustrating a second example of a SSB transmission from a network device of a wireless communication system, in accordance with various aspects of the present disclosure.

FIG. 5 illustrates a second example of a SSB transmission from the network device of the wireless communication system 100. Network device 102 depicted in FIG. 5 is similar in many respects to the network devices (e.g., base station 102) described above with reference to FIGS. 1, 3, and 4, and may include additional features not mentioned above.

The base station 102 may be configured to operate in a second frequency operating band (e.g., FR2 (24.25 GHz-52.6 GHz)) and may be further configured with a subcarrier spacing of 120 kHz and a SSB bitmap indicating that SSBs 16-17, 28-31, and 60 are enabled (e.g., SSB bitmap value of 0x0000000F00000008). The base station 102 may be configured to transmit SSBs during one or more of five measurement windows (e.g., measurement windows 0-4). Each of the five measurement windows may have a duration of 1 millisecond (or 30720 $T_S$). As shown in FIG. 5, the base station 102 may be configured to transmit SSB_16 and SSB_17 during measurement window 1, to transmit SSB_28, SSB_29, SSB_30, SSB_31 during measurement window 2, and to transmit SSB_60 during measurement window 4. Alternatively or additionally, the base station 102 may transmit SSBs 16-17, 28-31, and 60 in corresponding predefined directions.

A UE 104 may be configured to receive SSB_16 and SSB_17 by monitoring one or more resources for receiving SSB transmissions during the full duration (e.g., 1 millisecond) of the measurement window 1. However, the UE 104 may continue to monitor the one or more resources for receiving the SSB transmissions until measure window 1 has elapsed, even though no other SSBs are scheduled for measurement window 1. Similarly, the UE 104 may monitor the one or more resources for receiving the SSB transmissions during the full duration (e.g., 1 millisecond) of the measurement window 2. In some aspects, the UE 104 may receive SSB_28, SSB_29, SSB_30, but may not be able to receive SSB_31. For example, a SNR and/or RSRP level of SSB_31 may not exceed a minimum threshold. For another example, the UE 104 may not be located within the direction of SSB_31. However, the UE 104 may continue monitoring the one or more resources for receiving the SSB transmissions until the full duration of measurement window 2 has elapsed. Additionally, the UE 104 may receive SSB_60 by monitoring the one or more resources for receiving the SSB transmissions during the full duration (e.g., 1 millisecond) of the measurement window 4, even though only SSB_60 is scheduled for measurement window 4. As such, power consumption and efficiency of the UE 104 may be negatively impacted.

It may be understood that the exemplary SSB transmission configurations illustrated in FIGS. 4 and 5 are only two examples of SSB transmission configurations that may be utilized without departing from the scope described herein. For example, other configurations may incorporate different quantities of SSB transmissions or other subcarrier spacing values.

In some aspects, the UE 104 may include a measurement duration component 198 configured to dynamically determine a duration of a measurement window. For example, the measurement duration component 198 may determine a duration of a measurement window that may be shorter than the maximum duration of the measurement window (e.g., 1 millisecond). The UE 104 may be configured to stop monitoring the one or more resources for receiving the SSB transmissions after the determined measurement duration has elapsed rather than the maximum duration of the measurement window. As such, the UE 104 may power down receive circuitry of the UE 104 during a remaining portion of the measurement window. Alternatively or additionally, the UE 104 may enter a power saving state (e.g., micro-sleep) during such a portion of the measurement window. Thereby, power consumption and efficiency of the UE 104 may be positively impacted.

The measurement duration component 198 may be configured to determine a duration of a measurement window according to a last strong SSB of the measurement window. That is, the measurement duration component 198 may determine a corresponding last strong SSB for each measurement window scheduled by the SSB configuration. The last strong SSB of a measurement window may refer to a last SSB of one or more SSB transmitted during the measurement window that meet certain criteria. A SSB transmission that meets the criteria may indicate a strong SSB transmission that is potentially receivable and/or decodable.

In some aspects, the measurement duration component 198 may determine whether a SSB transmission is strong based at least on certain criteria, such as signal characteristics of the SSB transmissions (e.g., SNR and/or RSRP). For example, the measurement duration component 198 may compare a SNR of a SSB transmission with a SNR threshold. Alternatively or additionally, the measurement duration component 198 may compare a RSRP of the SSB transmission with a RSRP threshold. The measurement duration component 198 may determine that the SSB transmission is strong if or when the SNR exceeds the SNR threshold and the RSRP exceeds the RSRP threshold. In some aspects, the SNR threshold and/or the RSRP threshold may be predefined by a UE chipset or processor of the UE 104.

The measurement duration component 198 may determine whether each SSB scheduled to be transmitted during the measurement window meets the criteria for a strong SSB. Such determinations may result in a set of strong SSBs corresponding to the measurement window. For example, the measurement duration component 198 may determine that one or more SSBs transmitted during the measurement window meet the criteria for a strong SSB.

The measurement duration component 198 may sort the set of strong SSBs according to a SSB timing offset. The SSB timing offset may be an offset of the start of the corresponding SSB from the start of the measurement window. For example, a first SSB of a measurement window may have a SSB timing offset of zero. Alternatively or additionally, the SSB timing offset of an SSB may increase as the position or transmission order of the SSB within the measurement window increases. In some aspects, the measurement duration component 198 may be configured to sort the set of strong SSBs according to ascending SSB timing offset values and to determine the last strong SSB as the last strong SSB in the sort order. In other aspects, the measurement duration component 198 may be configured to sort the set of strong SSBs according to descending SSB timing offset values and to determine the last strong SSB as the first strong SSB in the sort order.

In some aspects, the measurement duration component 198 may be configured to determine the duration of the measurement window using the following equation:

$$\text{Duration} = \text{Offset\_Last\_SSB} + 4 * \text{Symbol\_Length} \quad \text{(Eq. 1)}$$

Referring to Eq. 1, Duration represents the determined duration of the measurement window from the start to the end of the measurement window. Duration may also represent an offset of the measurement duration end time. That is, Duration may also represent an offset of the end of the measurement duration from the start of the measurement window. Offset_Last_SSB represents the SSB timing offset of the last strong SSB of the measurement window. Symbol_Length represents a symbol length of the wireless communication system 100, in basic time units ($T_S$).

As described above in reference to FIGS. 2A-2D, the symbol length may be a function of the subcarrier spacing of the wireless communication system 100. For example, if or when the subcarrier spacing of the system 100 is set to Case A (e.g., 15 kHz), Case B (e.g., 30 kHz), Case C (e.g., 30 kHz), Case D (e.g., 120 kHz), or Case E (e.g., 240 kHz), the symbol length in basic time units ($T_S$) may be 2048, 1024, 512, 256, or 128, respectively.

Figure 6:
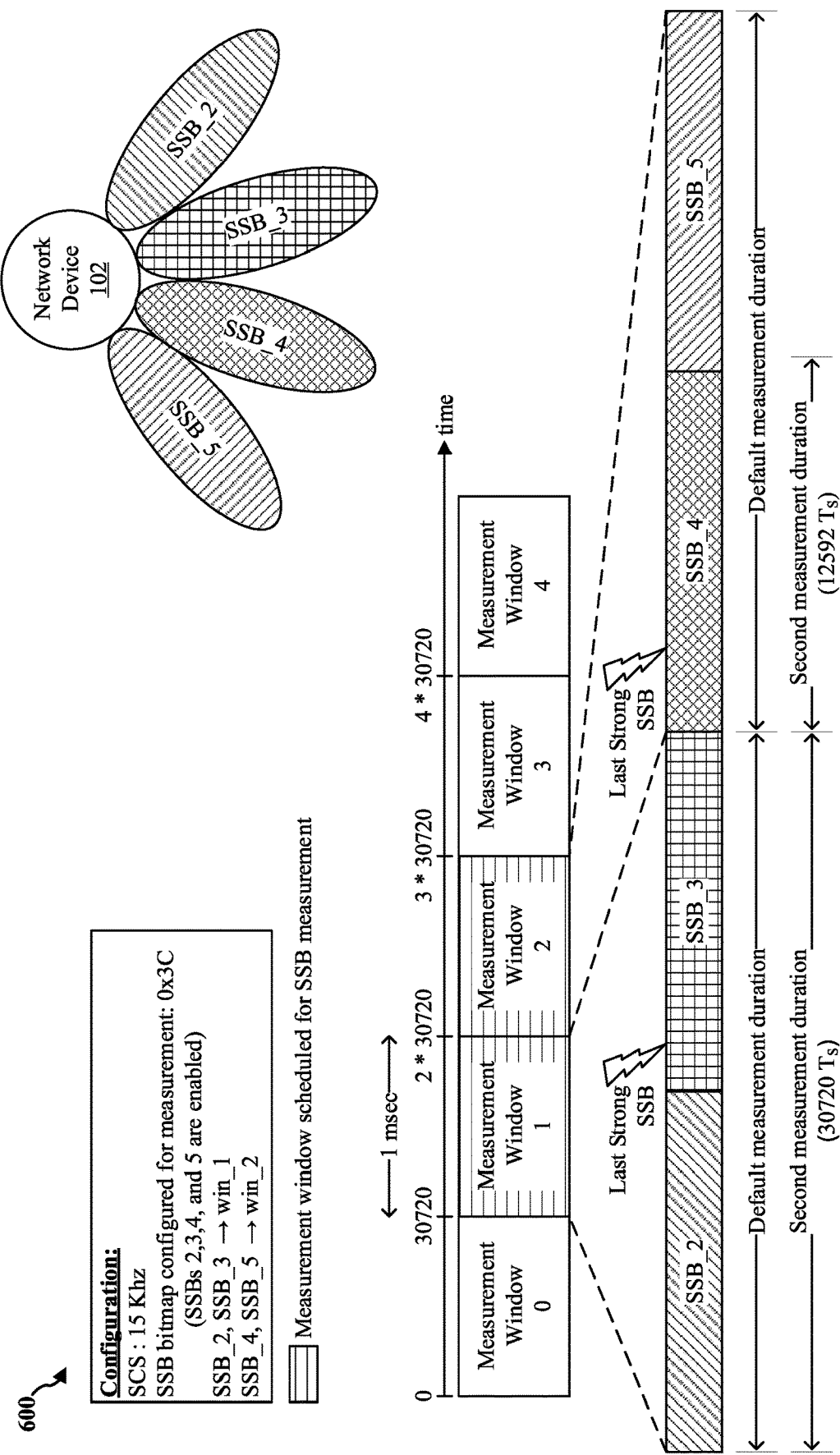
FIG. 6 is a diagram illustrating a first example of a measurement window duration calculation, in accordance with various aspects of the present disclosure.

FIG. 6 illustrates a first example of a measurement window duration calculation. Network device 102 depicted in FIG. 6 is similar in many respects to the network devices (e.g., base station 102) described above with reference to FIGS. 1, and 3-5, and may include additional features not mentioned above.

The SSB transmission configuration depicted in FIG. 6 is similar in many respects to the SSB transmission configuration described above in reference to FIG. 4. For example, the base station 102 in FIG. 6 may be configured to transmit SSB_2 and SSB_3 during measurement window 1 and to transmit SSB_4 and SSB_5 during measurement window 2.

In some aspects, the UE 104 and/or the measurement duration component 198 may determine that SSB_3 is the last strong SSB of measurement window 1. For example, the UE 104 may have determined that both SSB_2 and SSB_3 meet the criteria for a strong SSB. As such, the UE 104 may determine that the second duration of measurement window 1 is 1 millisecond (or 30720 $T_S$) according to the SSB time offset of SSB_3. Consequently, the UE 104 may stop monitoring for SSB transmissions after the ending point of the second duration of measurement window 1 has been reached (i.e., after 1 millisecond).

The UE 104 may further determine that SSB_4 is the last strong SSB of measurement window 2. For example, the UE may have determined that SSB_4 meets the criteria for a strong SSB and that SSB_5 does not meet the criteria. As such, the UE 104 may determine that the second duration of measurement window 2 is 12592 $T_S$ (or approximately 0.4 milliseconds), as shown in FIG. 6. Consequently, the UE 104 may stop monitoring for SSB transmissions after the ending point of the second duration of measurement window 2 has been reached (i.e., after approximately 0.4 milliseconds) rather than the full (i.e., default) duration of the measurement window (i.e., 1 millisecond). That is, the UE 104 may monitor measurement window 2 for SSB transmissions for a shorter duration when compared to a conventional UE. In some aspects, the UE 104 may power down at least a portion of the receive circuitry of UE 104 during the remaining portion of the measurement window 2. Alternatively or additionally, the UE 104 may enter a power saving state (e.g., micro-sleep) in response to reaching the ending point of the second duration of the measurement window 2. That is, the UE 104, comprising the measurement duration component 198, may experience reduced power consumption and increased efficiency when compared to a conventional UE.

Figure 7:
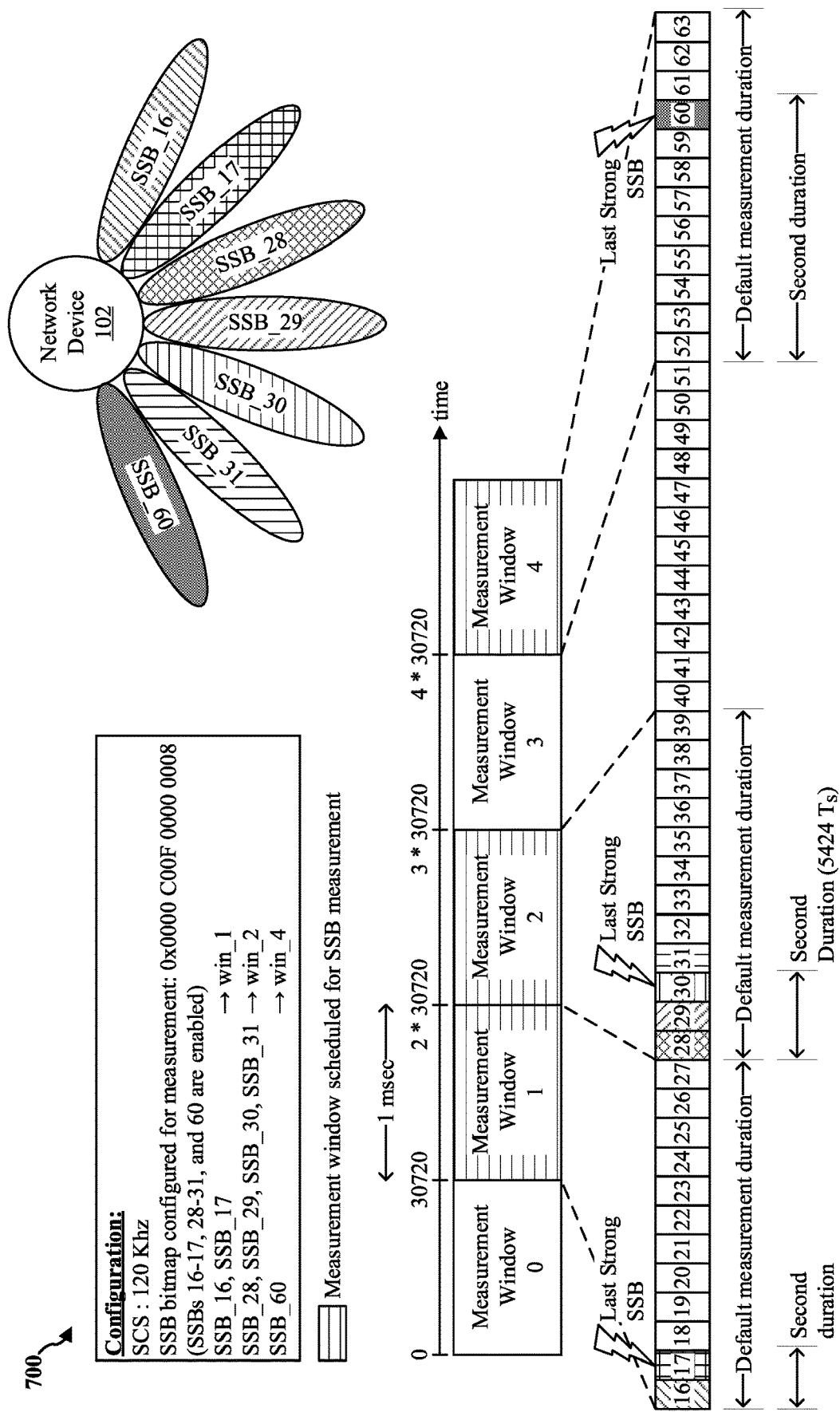
FIG. 7 is a diagram illustrating a second example of a measurement window duration calculation, in accordance with various aspects of the present disclosure

FIG. 7 illustrates a second example of a measurement window duration calculation. Network device 102 depicted in FIG. 7 is similar in many respects to the network devices (e.g., base station 102) described above with reference to FIGS. 1, and 3-6, and may include additional features not mentioned above.

The SSB transmission configuration depicted in FIG. 7 is similar in many respects to the SSB transmission configuration described above in reference to FIG. 5. For example, the base station 102 in FIG. 6 may be configured to transmit SSB_16 and SSB_17 during measurement window 1, to transmit SSB_28, SSB_29, SSB_30, SSB_31 during measurement window 2, and to transmit SSB_60 during measurement window 4.

In some aspects, a UE 104, comprising measurement duration component 198, may determine that SSB_17, SSB_30, and SSB_60 are the last strong SSBs of measurement windows 1, 2, and 4, respectively. For example, the UE 104 may have determined that SSB_16, SSB_17, SSB_28, SSB_29, SSB_30, and SSB_60 meet the criteria for a strong SSB and that SSB 31 does not meet the criteria. As such, the UE 104 may determine that the second durations of measurement windows 1, 2, and 4 end shortly after the transmissions of SSB_17, SSB_30, and SSB_60, respectively. For example, measurement window 2 may have a second duration of 5424 $T_S$ (or approximately 0.17 milliseconds), as shown in FIG. 7.

Consequently, the UE 104 may stop monitoring for SSB transmissions after reaching the respective ending points of the second durations of measurement windows 1, 2, and 4. That is, the UE 104 may monitor measurement windows 1, 2, and 4 for SSB transmissions for shorter durations when compared to a conventional UE. In some aspects, the UE 104 may power down at least a portion of the receive circuitry of UE 104 during the remaining portions of the measurement windows. Alternatively or additionally, the UE 104 may enter a power saving state (e.g., micro-sleep) in response to reaching the respective ending points of the second durations of the measurements windows. That is, the UE 104, comprising the measurement duration component 198, may experience reduced power consumption and increased efficiency when compared to a conventional UE.

The UE 104 may restart monitoring for SSB transmissions if or when the start of a subsequent measurement window with scheduled SSB transmissions has been reached.

FIGS. 8A-8B depict a first example log illustrating sample results of a measurement window duration calculation demonstration. The demonstration system 800 may be configured with 30 kHz (Case C) subcarrier spacing 804, and a 0x8000000000000000 SSB measurement bitmap 802. That is, only SSB_0 of measurement window 0 may be enabled for SSB measurements.

In some aspects, the UE 104 and/or the measurement duration component 198 of demonstration system 800 may determine 6311 $T_S$ (or approximately 0.2 milliseconds) for the measurement window end time offset 806 (i.e., second duration). That is, the UE 104 may stop monitoring for SSB transmissions after reaching the ending point of the second duration of measurement window 0 (i.e., after approximately 0.2 milliseconds) rather than the full duration of the measurement window (i.e., 1 millisecond). That is, the UE 104, comprising the measurement duration component 198, may experience reduced power consumption and increased efficiency when compared to a conventional UE.

FIGS. 9A-9B depict a second example log illustrating sample results of a measurement window duration calculation demonstration. The demonstration system 900 may be configured with 120 kHz (Case D) subcarrier spacing 904, and a 0xC000000000000003 SSB measurement bitmap 902. That is, SSB_0, SSB_1, SSB_62, and SSB_63 may be enabled for SSB measurements.

In some aspects, the UE 104 and/or the measurement duration component 198 of demonstration system 800 may determine 3232 $T_S$ (or approximately 0.1 milliseconds) and 21880 $T_S$ (or approximately 0.7 milliseconds) for the measurement window end time offset 906 (i.e., second duration) of measurement windows 0 and 4, respectively. That is, the UE 104 may monitor for SSB transmissions for approximately 0.1 and 0.7 milliseconds rather than monitoring during two full measurement window durations (i.e., 1 millisecond each). That is, the UE 104, comprising the measurement duration component 198, may experience reduced power consumption and increased efficiency when compared to a conventional UE.

Figure 10:
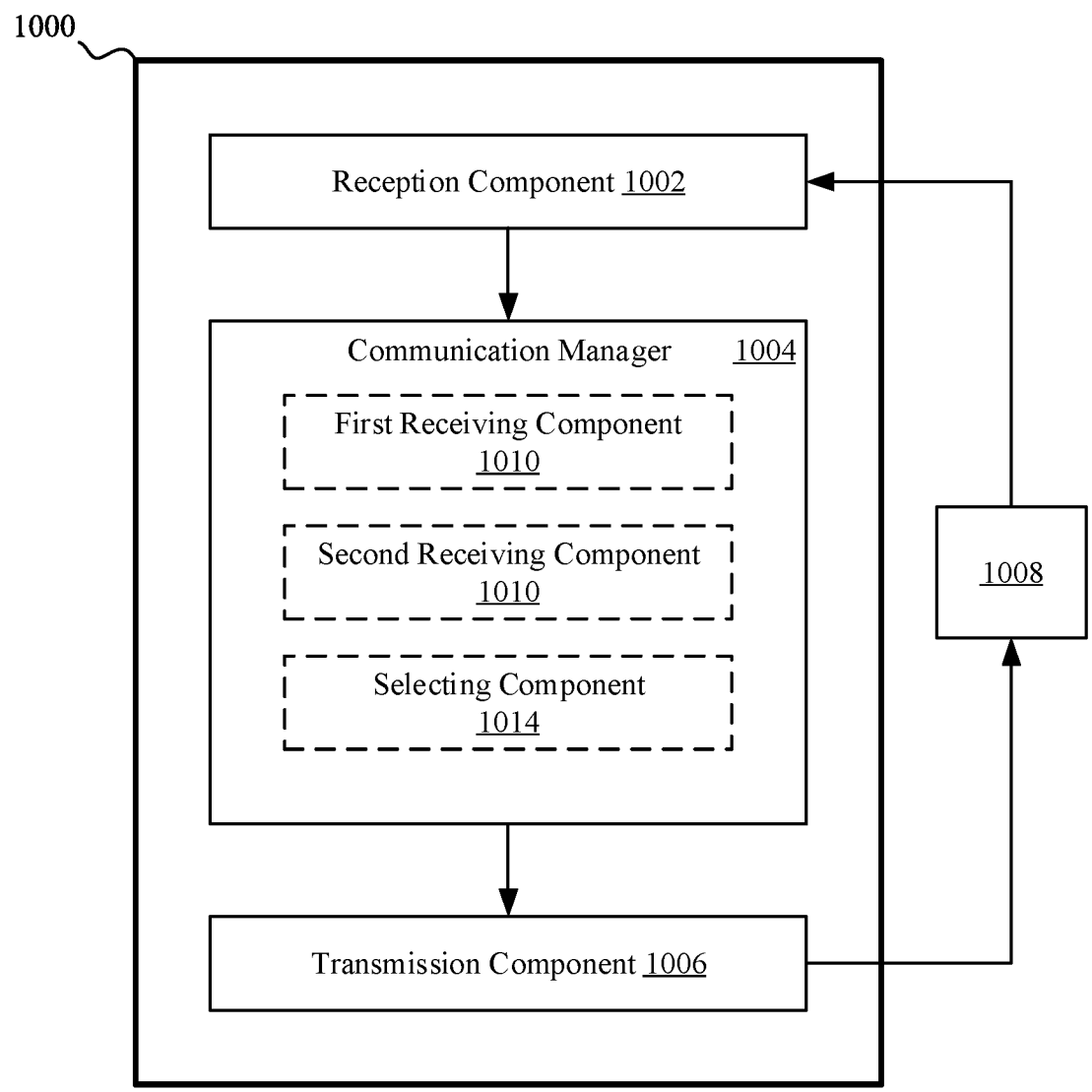
FIG. 10 is a diagram illustrating an example apparatus, in accordance with various aspects of the present disclosure.

FIG. 10 is a block diagram of an example apparatus 1000 for wireless communication. The apparatus 1000 may be a UE (e.g., UE 104 of FIGS. 1 and 3-9) or a UE may include the apparatus 1000. In some aspects, the apparatus 1000 includes a reception component 1002 configured to receive communications from another apparatus (e.g., apparatus 1008), a communication manager 1004 configured to determine durations of measurement windows, a transmission component 1006 configured to transmit communications to the apparatus 1008, and which may be in communication with one another (for example, via one or more buses or electrical connections). As shown, the apparatus 1000 may be in communication with another apparatus 1008 (such as a base station, or another network-side wireless communication device) using the reception component 1002 and the transmission component 1006.

In some aspects, the apparatus 1000 may be configured to perform one or more operations described herein in connection with FIGS. 4-9. Additionally or alternatively, the apparatus 1000 may be configured to perform one or more processes described herein, such as method 1100 of FIGS. 11-12. In some aspects, the apparatus 1000 may include one or more components of the UE described above in connection with FIGS. 1 and 3.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 1002 may include one or more antennas, a demodulator, a MIMO detector, a receiver, a receive processor, a controller/processor, a memory, or a combination thereof, of the UE described above in connection with FIGS. 1 and 3.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In other aspects, the transmission component 1006 may include one or more antennas, a modulator, a transmit MIMO processor, a transmitter, a transmit processor, a controller/processor, a memory, or a combination thereof, of the UE described above in connection with FIGS. 1 and 3. In some aspects, the transmission component 1006 may be co-located with the reception component 1002 in a transceiver or transceiver component.

The communication manager 1004 may receive SSB configurations that schedule measurement windows having first durations, may receive SSBs during the measurement windows, and may select second durations of the measurement windows according to the received SSBs. For example, the communication manager 1004 may start and stop monitoring of the resources for receiving the SSB transmissions. In another example, the communication manager 1004 may select sets of SSBs that meet certain criteria, may sort the sets of SSBs, may select lasts SSB from the sorted sets of SSBs, and may calculate second durations of the measurement windows according to the last SSBs. In some aspects, the communication manager 1004 may include a controller/processor, a memory, or a combination thereof, of the UE described above in connection with FIGS. 1 and 3.

In some aspects, the communication manager 1004 may include a set of components, such as a first receiving component 1010, a second receiving component 1012, and a selecting component 1014, or a combination thereof. Alternatively, the set of components may be separate and distinct from the communication manager 1004. In some aspects, one or more components of the set of components may include or may be implemented within a controller/processor, a memory, or a combination thereof, of the UE described above in connection with FIGS. 1 and 3. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The first receiving component 1010 may receive SSB configurations from the apparatus 1008. The SSB configurations may cause the apparatus 1008 to schedule measurement windows having first durations.

The second receiving component 1012 may receive SSBs from the apparatus 1008 during the measurement windows. For example, the second receiving component 1012 may start monitoring resources for receiving the SSB transmissions in response to reaching starting points of the measurement windows. In another example, the second receiving component 1012 may stop monitoring the resources for receiving the SSB transmissions in response to reaching ending points of the second durations of the measurement windows. Alternatively or additionally, the second receiving component 1012 may power down at least portions of receiving circuitry of the apparatus 1000.

The selecting component 1014 may select second durations of the measurement windows according to the received SSBs. The second durations may be shorter than the first durations, as discussed above in reference to FIGS. 6-7. For example, the selecting component 1014 may select sets of SSBs that may have measurement criteria that exceeds a respective threshold, may sort the sets of SSBs according to timing offsets of respective SSBs, may select last SSBs from the sorted sets of SSBs, and may calculate second durations of measurement windows according to the last SSBs. The last SSBs may have corresponding timing offsets that exceed remaining timing offsets of the respective SSBs of the sets of SSBs. Alternatively or additionally, the selecting component 1014 may calculate the second durations of the measurement windows according to offsets from the starting points of measurement windows to the starting points of the last SSBs, and symbol lengths.

Figure 11:
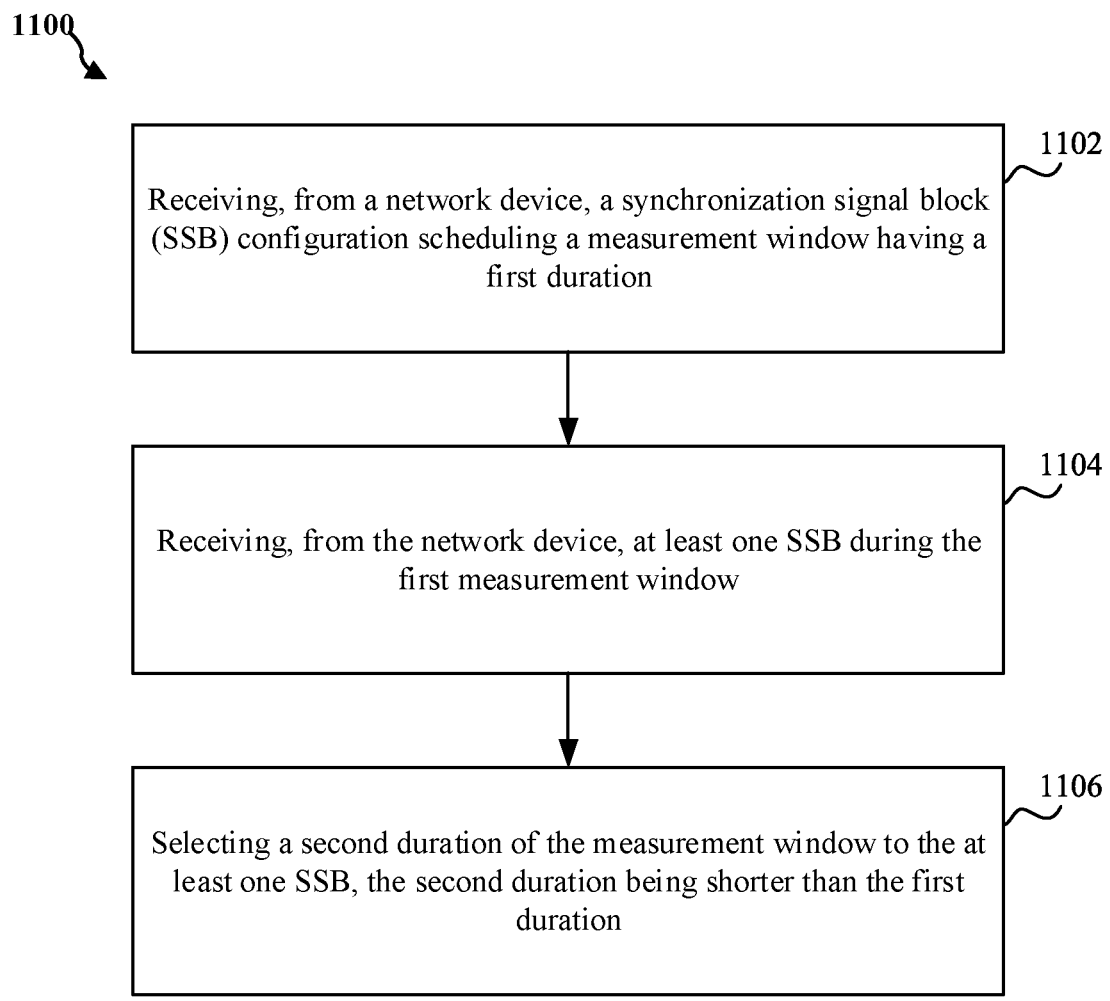
FIG. 11 is a flowchart of a method of wireless communication at a UE, in accordance with various aspects of the present disclosure.
Figure 12:
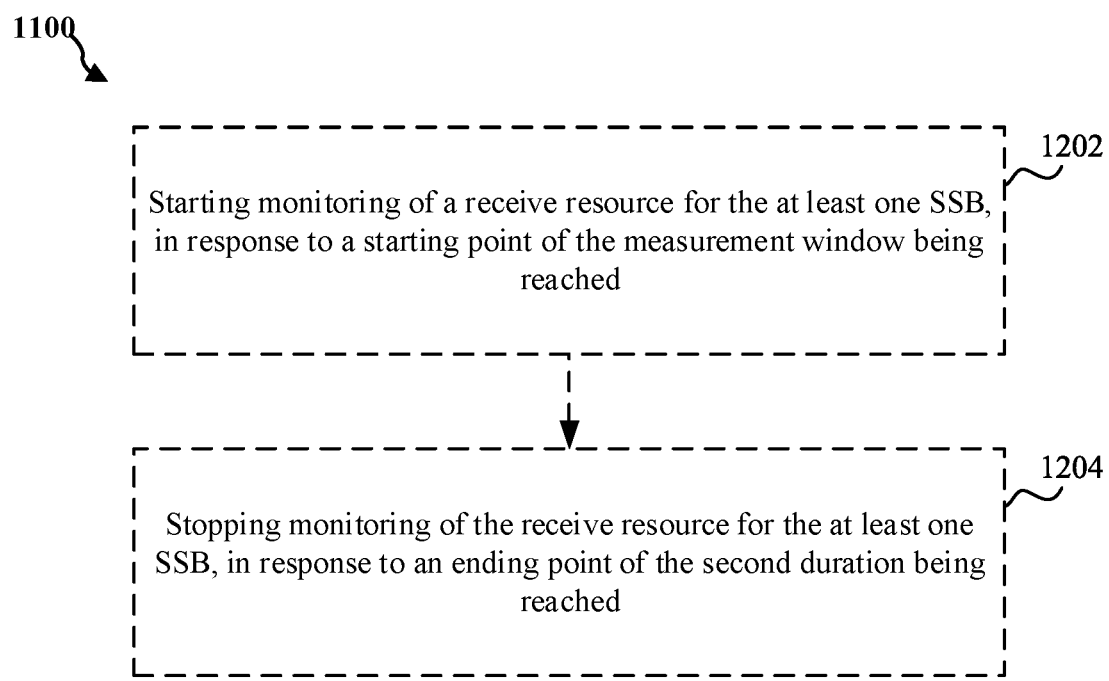
FIG. 12 is a flowchart of additional or optional steps for the method of wireless communication at the UE, in accordance with various aspects of the present disclosure.

Referring to FIGS. 11-12, in operation, a UE 104 may perform a method 1100 of wireless communication. The method 1100 may be performed by the UE 104 (which may include the memory 360 and which may be the entire UE 100 and/or one or more components of the UE 104 such as the measurement duration component 198, the TX processor 368, the RX processor 356, and/or the controller/processor 359). The method 1100 may be performed by the measurement duration component 198 in communication with the base station 102.

At block 1102 of FIG. 11, the method 1100 includes receiving, from a network device, a SSB configuration scheduling a measurement window having a first duration. For example, in an aspect, the UE 104, the measurement duration component 198, and/or the first receiving component 1010 may be configured to or may comprise means for receiving, from a network device 102, the SSB configuration scheduling the measurement window having the first duration.

For example, the receiving at block 1102 may include receiving the SSB configuration that may schedule one or more measurement windows during which the UE 104 is to receive the one or more SSBs. In some optional or additional aspects, the SSB configuration may indicate which SSBs are being transmitted and which SSBs are not being transmitted. In other optional or additional aspects, the SSB configuration may comprise a SSB bitmask and/or a SSB burst indicating which SSBs are being transmitted, out of a maximum number of SSBs that may be transmitted.

Further, for example, the receiving at block 1102 may be performed to provide an indication to the UE 104 of the SSB transmission schedule. Such an indication may allow the UE 104 to determine when to monitor the one or more resources for receiving the scheduled SSB transmissions.

At block 1104, the method 1100 may include receiving, from the network device, at least one SSB during the measurement window. For example, in an aspect, the UE 104, the measurement duration component 198, and/or the second receiving component 1012 may be configured to or may comprise means for receiving, from the network device 102, the at least one SSB during the measurement window.

For example, the receiving at block 1104 may include monitoring one or more resources for receiving the SSB transmissions during the one or more measurement windows scheduled via the SSB configuration. In some optional or additional aspects, the receiving at block 1104 may include activating or powering up at least a portion of receive circuitry of the UE 104 during each of the one or more measurement windows. In other optional or additional aspects, the receiving at block 1104 may include not receiving SSBs during at least a portion of one of the measurement windows. In some optional or additional aspects, the network device 102 may not transmit a maximum number of SSBs, and as such, at least a portion of the measurement window may not comprise SSB transmissions. In some optional or additional aspects, a receive signal strength of a transmitted SSB may not be sufficient to be received and/or decoded by the UE 104. In other optional or additional aspects, a location of the apparatus 1000 may prevent reception of a SSB transmission.

Further, for example, the receiving at block 1104 may be performed to provide the UE 104 with downlink synchronization information and/or system information of the network device 102. Such information may allow the UE 104 to synchronize with the wireless communication system 100.

At block 1106, the method 1100 may include selecting a second duration of the measurement window according to the at least one SSB, the second duration being shorter than the first duration. For example, in an aspect, the UE 104, the measurement duration component 198, and/or the selecting component 1014 may be configured to or may comprise means for selecting the second duration of the measurement window according to the at least one SSB, the second duration being shorter than the first duration.

For example, the selecting at block 1106 may include determining the second duration of the measurement window according to a last strong SSB received during the measurement window. The last strong SSB of the measurement window may refer to a last SSB of one or more SSB transmitted during the measurement window that meet certain criteria. The criteria may comprise signal characteristics of the SSB transmissions, such as SNR and/or RSRP. A SSB transmission that meets the criteria may indicate a strong SSB transmission that is potentially receivable and/or decodable.

In some optional or additional aspects, the selecting at block 1106 may include selecting a set of strong SSBs from the at least one SSB. Each strong SSB of the set of strong SSBs may have one or more measurement criteria that exceed a respective threshold. In some optional or additional aspects, the respective thresholds may be predefined by a UE chipset of the UE 104.

In some optional or additional aspects, the selecting at block 1106 may include sorting the set of strong SSBs according to timing offsets of respective SSBs of the set of strong SSBs, resulting in a sorted set of strong SSBs. The SSB timing offset may be an offset of the start of the corresponding SSB from the start of the measurement window.

In some optional or additional aspects, the selecting at block 1106 may include selecting a last strong SSB from the sorted set of strong SSBs. The last strong SSB may have a corresponding timing offset that may exceed remaining timing offsets of the respective SSBs of the set of strong SSBs. In some optional or additional aspects, the selecting at block 1106 may include sorting the set of strong SSBs according to ascending SSB timing offset values and determining the last strong SSB as the last strong SSB in the sort order. In other optional or additional aspects, the selecting at block 1106 may include sorting the set of strong SSBs according to descending SSB timing offset values and determining the last strong SSB as the first strong SSB in the sort order.

In some optional or additional aspects, the selecting at block 1106 may include calculating a second duration of the measurement window according to the last strong SSB. In some optional or additional aspects, the selecting at block 1106 may include calculating the second duration of the measurement window according to Eq. 1 as described above.

Further, for example, the selecting at block 1106 may be performed to dynamically determine a second duration of the measurement window that may be shorter than a maximum duration of the measurement window. Such a determination may allow the UE 104 to stop monitoring the one or more resources for receiving the SSB transmissions after the second duration has elapsed rather than after the first duration has elapsed. Alternatively or additionally, the determination may allow the UE 104 to power down receive circuitry of the UE 104 and/or to enter a power saving state (e.g., micro-sleep) during the remaining portion of the measurement window. Thus, aspects presented herein may reduce power consumption and increase efficiency of the wireless communication system 100.

Referring to FIG. 12, in an optional or additional aspect, in block 1202, the method 1100 may further include starting monitoring of a receive resource for the at least one SSB, in response to starting point of the measurement window being reached. For example, in an aspect, the UE 104, the measurement duration component 198, and/or the second receiving component 1012 may be configured to or may comprise means for starting monitoring of the receive resource for the at least one SSB, in response to the starting point of the measurement window being reached.

For example, the starting monitoring at block 1202 may include monitoring one or more resources for receiving the SSB transmissions according to the scheduled measurement windows indicated by the SSB configuration.

In some optional or additional aspects, the starting monitoring at block 1202 may include activating or powering up at least a portion of receive circuitry of the UE 104 during each of the one or more measurement windows.

Further, for example, the starting monitoring at block 1202 may be performed to receive one or more SSBs from network device 102. The UE 104 may obtain, from the received SSBs, downlink synchronization information and/or system information of the network device 102. Such information may allow the UE 104 to synchronize with the wireless communication system 100.

In this optional or additional aspect, in block 1204, the method 1100 may further include stopping monitoring of the receive resource for the at least one SSB, in response to an ending point of the second duration being reached. For example, in an aspect, the UE 104, the measurement duration component 198, and/or the second receiving component 1012 may be configured to or may comprise means for stopping monitoring of the receive resource for the at least one SSB, in response to the ending point of the second duration being reached.

For example, the stopping monitoring at block 1204 may include stopping monitoring the one or more resources for receiving the SSB transmissions after the second duration of the measurement window has expired and prior to the expiration of the first duration of the measurement window.

In some optional or additional aspects, the stopping monitoring at block 1204 may include powering down at least a portion of the receive circuitry of UE 104 after the ending point of the second duration has been reached and before the ending point of the first duration has been reached.

In some optional or additional aspects, the stopping monitoring at block 1204 may include having the UE 104 enter a power saving state (e.g., micro-sleep) in response to the expiration of the second duration prior to the expiration of the first duration.

Further, for example, the stopping monitoring at block 1204 may be performed to reduce power consumption and to increase efficiency of the wireless communication system 100.

Implementation examples are described in the following numbered clauses:

1. A method of wireless communication at a user equipment (UE), comprising: receiving, from a network device, a synchronization signal block (SSB) configuration scheduling a measurement window having a first duration;
receiving, from the network device, at least one SSB during the first measurement window; and
selecting a second duration of the measurement window according to the at least one SSB, the second duration being shorter than the first duration.

2. The method of clause 1, further comprising:
starting monitoring of a receive resource for the at least one SSB, in response to a starting point of the measurement window being reached; and
stopping monitoring of the receive resource for the at least one SSB, in response to an ending point of the second duration being reached.

3. The method of clause 2, wherein stopping monitoring of the receive resource comprises:
powering down at least a portion of a receiving circuitry of the UE.

4. The method of any of the clauses 1-3, wherein selecting the second duration of the measurement window comprises:
selecting a set of SSBs from the at least one SSB, each SSB of the set of SSBs having one or more measurement criteria that exceed a respective threshold;
sorting the set of SSBs according to timing offsets of respective SSBs of the set of SSBs, resulting in a sorted set of SSBs;
selecting a last SSB from the sorted set of SSBs, the last SSB having a corresponding timing offset that exceeds remaining timing offsets of the respective SSBs of the set of SSBs; and
calculating the second duration of the measurement window according to the last SSB.

5. The method of clause 4, wherein the one or more measurement criteria comprise a signal-to-noise ratio (SNR), a reference signal received power (RSRP), and a combination thereof.

6. The method of clauses 4 or 5, wherein calculating the second duration of the measurement window comprises calculating the second duration of the measurement window according to:
an offset from a first starting point of the measurement window to a second starting point of the last SSB; and
a symbol length.

7. The method of clause 6, wherein the second duration of the measurement window is calculated based on a relation:

$$\text{Offset\_Last\_SSB} + 4 * \text{Symbol\_Length}$$

wherein:
the Offset_Last_SSB is the offset from the first starting point of the measurement window to the second starting point of the last SSB; and
the Symbol_Length is the symbol length in basic time units ($T_S$).

8. An apparatus of wireless communication at a user equipment (UE), comprising:
a memory; and
a processor communicatively coupled with the memory and configured to:
receive, from a network device, a synchronization signal block (SSB) configuration scheduling a measurement window having a first duration;
receive, from the network device, at least one SSB during the first measurement window; and
select a second duration of the measurement window according to the at least one SSB, the second duration being shorter than the first duration.

9. The apparatus of clause 8, wherein the processor is further configured to:
  start monitoring of a receive resource for the at least one SSB, in response to a starting point of the measurement window being reached; and
  stop monitoring of the receive resource for the at least one SSB, in response to an ending point of the second duration being reached.

10. The apparatus of clause 9, wherein to stop monitoring of the receive resource comprises to:
  power down at least a portion of a receiving circuitry of the UE.

11. The apparatus of any of the clauses 8-10, wherein to select the second duration of the measurement window comprises to:
  select a set of SSBs from the at least one SSB, each SSB of the set of SSBs having one or more measurement criteria that exceed a respective threshold;
  sort the set of SSBs according to timing offsets of respective SSBs of the set of SSBs, resulting in a sorted set of SSBs;
  select a last SSB from the sorted set of SSBs, the last SSB having a corresponding timing offset that exceeds remaining timing offsets of the respective SSBs of the set of SSBs; and
  calculate the second duration of the measurement window according to the last SSB.

12. The apparatus of clause 11, wherein the one or more measurement criteria comprise a signal-to-noise ratio (SNR), a reference signal received power (RSRP), and a combination thereof.

13. The apparatus of clauses 11 or 12, wherein to calculate the second duration of the measurement window comprises to calculate the second duration of the measurement window according to:
  an offset from a first starting point of the measurement window to a second starting point of the last SSB; and
  a symbol length.

14. The apparatus of clause 13, wherein the second duration of the measurement window is calculated based on a relation:

$$\text{Offset\_Last\_SSB} + 4 * \text{Symbol\_Length}$$

wherein:
    the Offset_Last_SSB is the offset from the first starting point of the measurement window to the second starting point of the last SSB; and
    the Symbol_Length is the symbol length in basic time units ($T_S$).

15. A non-transitory computer-readable medium comprising stored instructions of wireless communication at a user equipment (UE), executable by a processor, that when executed by the processor cause the processor to:
  receive, from a network device, a synchronization signal block (SSB) configuration scheduling a measurement window having a first duration;
  receive, from the network device, at least one SSB during the first measurement window; and
  select a second duration of the measurement window according to the at least one SSB, the second duration being shorter than the first duration.

16. The non-transitory computer-readable medium of clause 15, further comprising stored instructions to:
  start monitoring of a receive resource for the at least one SSB, in response to a starting point of the measurement window being reached; and
  stop monitoring of the receive resource for the at least one SSB, in response to an ending point of the second duration being reached.

17. The non-transitory computer-readable medium of clause 16, wherein the stored instructions to stop monitoring of the receive resource comprises instructions to:
  power down at least a portion of a receiving circuitry of the UE.

18. The non-transitory computer-readable medium of any of the clauses 15-17, wherein the stored instructions to select the second duration of the measurement window comprises instructions to:
  select a set of SSBs from the at least one SSB, each SSB of the set of SSBs having one or more measurement criteria that exceed a respective threshold;
  sort the set of SSBs according to timing offsets of respective SSBs of the set of SSBs, resulting in a sorted set of SSBs;
  select a last SSB from the sorted set of SSBs, the last SSB having a corresponding timing offset that exceeds remaining timing offsets of the respective SSBs of the set of SSBs; and
  calculate the second duration of the measurement window according to the last SSB.

19. The non-transitory computer-readable medium of clause 18, wherein the one or more measurement criteria comprise a signal-to-noise ratio (SNR), a reference signal received power (RSRP), and a combination thereof.

20. The non-transitory computer-readable medium of clauses 18 or 19, wherein the stored instructions to calculate the second duration of the measurement window comprises instructions to calculate the second duration of the measurement window according to:
  an offset from a first starting point of the measurement window to a second starting point of the last SSB; and
  a symbol length.

21. The non-transitory computer-readable medium of clause 20, wherein the second duration of the measurement window is calculated based on a relation:

$$\text{Offset\_Last\_SSB} + 4 * \text{Symbol\_Length}$$

wherein:
    the Offset_Last_SSB is the offset from the first starting point of the measurement window to the second starting point of the last SSB; and
    the Symbol_Length is the symbol length in basic time units ($T_S$).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if" "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving, from a network device, a synchronization signal block (SSB) configuration scheduling a measurement window having a first duration;
   receiving, from the network device, at least one SSB during the measurement window;
   determining that a signal strength measurement of the at least one SSB exceeds a predefined threshold; and
   dynamically selecting, by the UE, a second duration of the measurement window based on the signal strength measurement of the at least one SSB exceeding the predefined threshold, the second duration being shorter than the first duration.

2. The method of claim 1, further comprising:
   starting monitoring of a receive resource for the at least one SSB, in response to a starting point of the measurement window being reached; and
   stopping monitoring of the receive resource for the at least one SSB, in response to an ending point of the second duration being reached.

3. The method of claim 2, wherein stopping monitoring of the receive resource comprises:
   powering down at least a portion of a receiving circuitry of the UE.

4. The method of claim 1, wherein selecting the second duration of the measurement window comprises:
   selecting a set of SSBs from the at least one SSB, each SSB of the set of SSBs having one or more measurement criteria that exceed a respective threshold;
   sorting the set of SSBs according to timing offsets of respective SSBs of the set of SSBs, resulting in a sorted set of SSBs;
   selecting a last SSB from the sorted set of SSBs, the last SSB having a corresponding timing offset that exceeds remaining timing offsets of the respective SSBs of the set of SSBs; and
   calculating the second duration of the measurement window according to the last SSB.

5. The method of claim 4, wherein the one or more measurement criteria comprise a signal-to-noise ratio (SNR), a reference signal received power (RSRP), and a combination thereof.

6. The method of claim 4, wherein calculating the second duration of the measurement window comprises calculating the second duration of the measurement window according to:
   an offset from a first starting point of the measurement window to a second starting point of the last SSB; and
   a symbol length.

7. The method of claim 6, wherein the second duration of the measurement window is calculated based on a relation:

$$\text{Offset\_Last\_SSB} + 4 * \text{Symbol\_Length}$$

wherein:
   the Offset_Last_SSB is the offset from the first starting point of the measurement window to the second starting point of the last SSB; and
   the Symbol_Length is the symbol length in basic time units (Ts).

8. An apparatus of wireless communication at a user equipment (UE), comprising:
   a non-transitory memory storing computer-executable instructions; and
   a processor communicatively coupled with the non-transitory memory and configured to execute the computer-executable instructions to:
      receive, from a network device, a synchronization signal block (SSB) configuration scheduling a measurement window having a first duration;
      receive, from the network device, at least one SSB during the measurement window;
      determine that a signal strength measurement of the at least one SSB exceeds a predefined threshold; and
      dynamically select, by the UE, a second duration of the measurement window based on the signal strength measurement of the at least one SSB exceeding the predefined threshold, the second duration being shorter than the first duration.

9. The apparatus of claim 8, wherein the processor is configured to execute further instructions to:

start monitoring of a receive resource for the at least one SSB, in response to a starting point of the measurement window being reached; and stop monitoring of the receive resource for the at least one SSB, in response to an ending point of the second duration being reached.

10. The apparatus of claim 9, wherein to stop monitoring of the receive resource comprises to:
   power down at least a portion of a receiving circuitry of the UE.

11. The apparatus of claim 8, wherein to select the second duration of the measurement window comprises to:
   select a set of SSBs from the at least one SSB, each SSB of the set of SSBs having one or more measurement criteria that exceed a respective threshold;
   sort the set of SSBs according to timing offsets of respective SSBs of the set of SSBs, resulting in a sorted set of SSBs;
   select a last SSB from the sorted set of SSBs, the last SSB having a corresponding timing offset that exceeds remaining timing offsets of the respective SSBs of the set of SSBs; and
   calculate the second duration of the measurement window according to the last SSB.

12. The apparatus of claim 11, wherein the one or more measurement criteria comprise a signal-to-noise ratio (SNR), a reference signal received power (RSRP), and a combination thereof.

13. The apparatus of claim 11, wherein to calculate the second duration of the measurement window comprises to calculate the second duration of the measurement window according to:
   an offset from a first starting point of the measurement window to a second starting point of the last SSB; and
   a symbol length.

14. The apparatus of claim 13, wherein the second duration of the measurement window is calculated based on a relation:

Offset_Last_SSB+4*Symbol_Length wherein:
   the Offset_Last_SSB is the offset from the first starting point of the measurement window to the second starting point of the last SSB; and
   the Symbol_Length is the symbol length in basic time units (Ts).

15. A non-transitory computer-readable medium comprising stored instructions of wireless communication at a user equipment (UE), executable by a processor, that when executed by the processor cause the processor to:
   receive, from a network device, a synchronization signal block (SSB) configuration scheduling a measurement window having a first duration;
   receive, from the network device, at least one SSB during the measurement window;
   determine that a signal strength measurement of the at least one SSB exceeds a predefined threshold; and
   dynamically select, by the UE, a second duration of the measurement window based on the signal strength measurement of the at least one SSB exceeding the predefined threshold, the second duration being shorter than the first duration.

16. The non-transitory computer-readable medium of claim 15, further comprising stored instructions to:
   start monitoring of a receive resource for the at least one SSB, in response to a starting point of the measurement window being reached; and
   stop monitoring of the receive resource for the at least one SSB, in response to an ending point of the second duration being reached.

17. The non-transitory computer-readable medium of claim 16, wherein the stored instructions to stop monitoring of the receive resource comprises instructions to:
   power down at least a portion of a receiving circuitry of the UE.

18. The non-transitory computer-readable medium of claim 15, wherein the stored instructions to select the second duration of the measurement window comprises instructions to:
   select a set of SSBs from the at least one SSB, each SSB of the set of SSBs having one or more measurement criteria that exceed a respective threshold;
   sort the set of SSBs according to timing offsets of respective SSBs of the set of SSBs, resulting in a sorted set of SSBs;
   select a last SSB from the sorted set of SSBs, the last SSB having a corresponding timing offset that exceeds remaining timing offsets of the respective SSBs of the set of SSBs; and
   calculate the second duration of the measurement window according to the last SSB.

19. The non-transitory computer-readable medium of claim 18, wherein the one or more measurement criteria comprise a signal-to-noise ratio (SNR), a reference signal received power (RSRP), and a combination thereof.

20. The non-transitory computer-readable medium of claim 18, wherein the stored instructions to calculate the second duration of the measurement window comprises instructions to calculate the second duration of the measurement window according to:
   an offset from a first starting point of the measurement window to a second starting point of the last SSB; and
   a symbol length.

21. The non-transitory computer-readable medium of claim 20, wherein the second duration of the measurement window is calculated based on a relation:

Offset_Last_SSB+4*Symbol_Length wherein:
   the Offset_Last_SSB is the offset from the first starting point of the measurement window to the second starting point of the last SSB; and
   the Symbol_Length is the symbol length in basic time units (Ts).

* * * * *